May 23, 1950   A. P. ADAMSON   2,508,985
ANGULAR MOTION TRANSMITTING APPARATUS
Filed Aug. 1, 1946   2 Sheets-Sheet 1

Inventor:
Arthur P. Adamson,
by Claude H. ____
His Attorney.

May 23, 1950     A. P. ADAMSON     2,508,985
ANGULAR MOTION TRANSMITTING APPARATUS
Filed Aug. 1, 1946     2 Sheets-Sheet 2
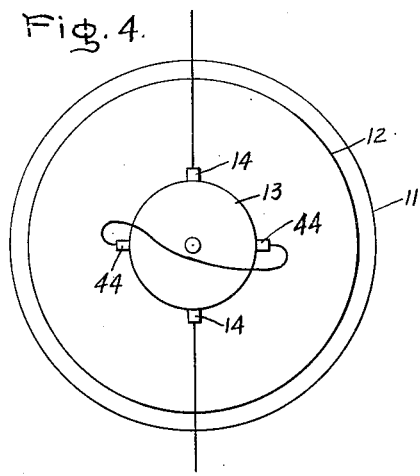
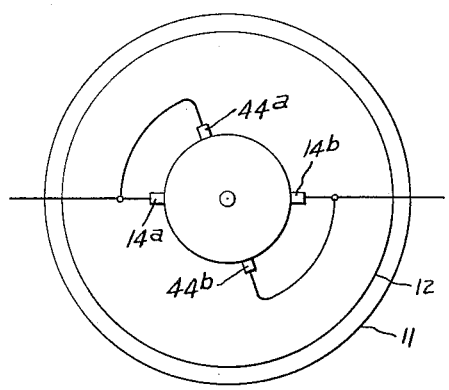
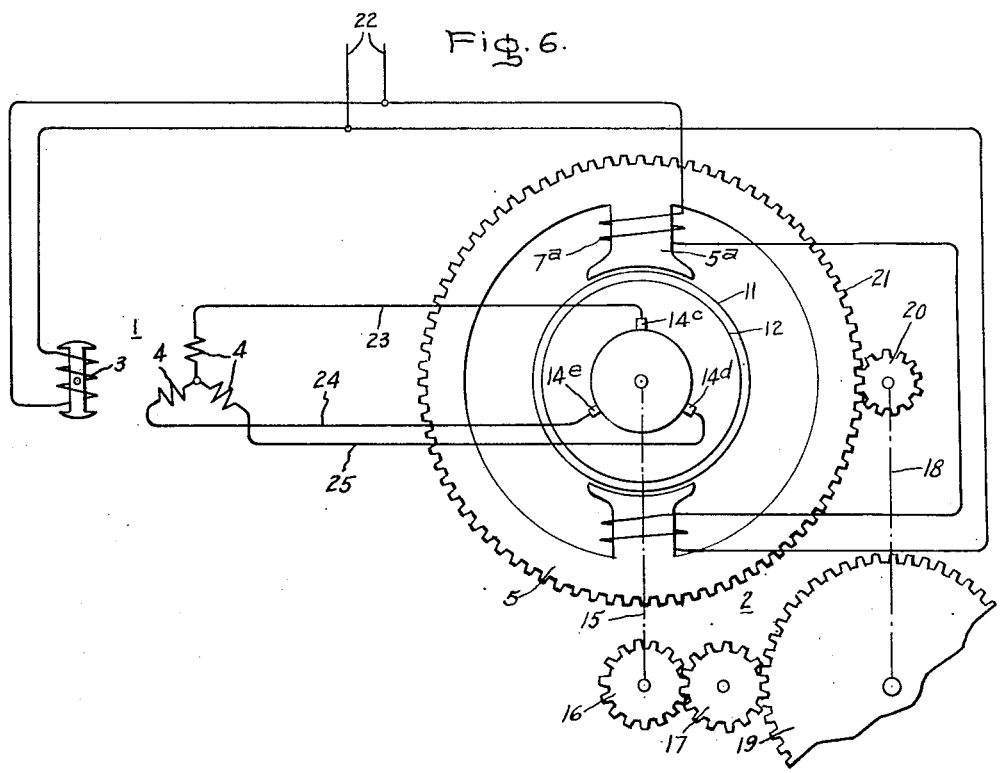
Inventor:
Arthur P. Adamson,
by Claude H. Nott
His Attorney.

Patented May 23, 1950

2,508,985

UNITED STATES PATENT OFFICE 2,508,985

ANGULAR MOTION TRANSMITTING APPARATUS

Arthur P. Adamson, Ballston Spa, N. Y., assignor to General Electric Company, a corporation of New York Application August 1, 1946, Serial No. 687,550

9 Claims. (Cl. 318—24)

The present invention relates to angular motion transmitting apparatus and more particularly to angular motion transmitting apparatus of an electrical type involving transmitter and receiver units known in the art as Selsyns.

Reference is made to a division of my application similarly entitled which was filed March 27, 1948 and which issued as Patent 2,458,921 on January 11, 1949.

Selsyn angular motion transmitting systems of the type now widely used comprise similar transmitter and receiver Selsyn units which are electrically interconnected. Each Selsyn unit comprises a rotor member and a stator member having electrical windings thereon one of which has a single phase connection and the other having polyphase connections. The windings of the transmitter and receiver Selsyns having polyphase connections are interconnected and the windings of the transmitter and receiver Selsyn having single phase connections are energized from a common source of periodically varying or alternating current. With this arrangement when the rotor of the transmitter Selsyn is angularly displaced, the rotor and stator magnetic fields of the receiver Selsyn are correspondingly displaced causing the rotor of the receiver Selsyn to seek an equilibrium position in angular correspondence with the rotor of the transmitter Selsyn. Because of this self-synchronous property of interconnected Selsyns, they have found wide application in industry for remote indication and control purposes. However, for remote control purposes, conventional Selsyn systems are subject to the disadvantage that unless the torque output of the receiver Selsyn is kept at a very low value, there is a serious loss of accuracy. Stated in another way, for remote control applications where a high torque is required, the transmitter and receiver units of the conventional Selsyn systems become prohibitively large.

An object of the present invention is to provide improved angular motion transmitting apparatus.

A further object of the invention is to provide improved angular motion transmitting apparatus of the Selsyn type in which the receiver Selsyn develops higher torque without substantial loss of accuracy than heretofore possible with transmitter and receiver Selsyns of comparable size.

A still further object of the invention is to provide a receiver Selsyn which may be connected to a conventional transmitter Selsyn for remote indication and control and will develop a much higher torque than heretofore possible with apparatus of comparable size and cost.

Further objects and advantages of my invention will become apparent as the following description proceeds and the features of novelty which characterize my invention will be pointed out with particularity in the claims annexed to and forming a part of this specification.

For a better understanding of my invention reference may be made to the following detailed specification and the accompanying drawing in which:

Fig. 4 is a modified brush arrangement for obtaining higher torque and damping in the receiver Selsyn.

Fig. 5 is a variant of the brush arrangement shown in Fig. 4, and

Fig. 6 shows a modified arrangement in which the receiver Selsyn rotor is provided with polyphase connections and the stator with single phase connections instead of the reverse arrangement shown in Figs. 1, 2, and 3.

Figure 1:
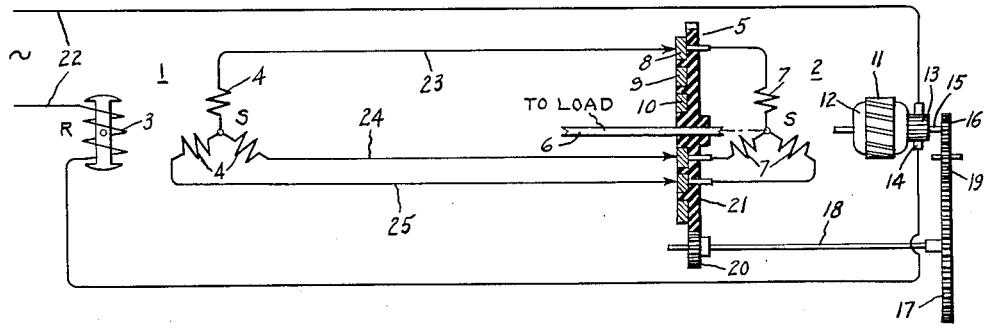
Fig. 1 is a schematic representation of a Selsyn system having a high torque receiver Selsyn constructed in accordance with my invention.

Referring to Fig. 1 of the drawing, I have shown, in somewhat schematic form, angular motion transmitting apparatus of the Selsyn type comprising a transmitter Selsyn indicated generally at 1 and a receiver Selsyn indicated generally at 2. The transmitter Selsyn 1 which is of conventional construction is shown as comprising a rotor having a rotor winding 3 provided with single phase connections and a stator having polyphase windings 4 provided with polyphase connections.

The receiver Selsyn 2 is shown as comprising a stator member 5 which is rigidly secured to a load shaft 6, the shaft being rotatably mounted in fixed bearing supports, not shown. The stator member 5 carries conventional polyphase windings 7 having polyphase connections which are electrically connected to slip rings 8, 9, and 10.

As pointed out above, the conventional receiver Selsyn is provided with a rotor winding which is similar in construction to the transmitter Selsyn rotor winding. However, in accordance with my invention I provide a different type of rotor winding in the receiver Selsyn whereby a different and improved mode of operation is obtained for reasons which will become apparent as the following description proceeds. In place of the conventional receiver Selsyn rotor I provide a rotor member 11 which may be exactly the same as the rotor armature of the conventional direct current motor or generator. Thus the rotor member 11 is provided with a winding 12 which is connected to a commutator 13. The winding 12 may for example be a conventional wave winding such as is used on direct current machines. The commutator 13 is engaged by diametrically opposite brushes 14 which provide single phase connections for conducting current to the receiver rotor winding 12. The brushes 14 are carried by a fixed support, not shown. With this arrangement when the brushes 14 are energized, the receiver Selsyn rotor winding 12 produces a magnetic field the axis of which is fixed relative to the brushes 14 as will be well understood by those skilled in the art. When the receiver Selsyn stator windings 7 are energized they produce a magnetic field which reacts with the rotor magnetic field produced by the winding 12 and whenever the rotor and stator magnetic field axes are displaced from a position of correspondence the rotor 11 rotates continuously and will continue to do so until correspondence of the rotor and stator fields is restored.

For the purpose of automatically restoring correspondence of the axes of the receiver rotor and stator magnetic fields once they have been displaced as by action of the transmitter Selsyn 1, there is provided an arrangement for drivably connecting the stator member 5 to the rotor 11 of the receiver Selsyn. For this purpose the rotor 11 has a shaft 15 carrying a pinion 16 which drives a gear 17 mounted on a shaft 18 through an idler gear 19. The shaft 18 also carries a pinion 20 meshing with a gear 21 which is carried by or forms a part of the stator member 5 as indicated in the drawing. The gear ratio between the rotor 11 and the stator 5 is such that the stator rotates at an angular speed different from and preferably less than the speed of the rotor 11. Thus it will be clear that any desired torque output at the load shaft 6 may be obtained by selecting the proper gear ratio in the drive between the rotor 11 and stator 5.

Figure 3:
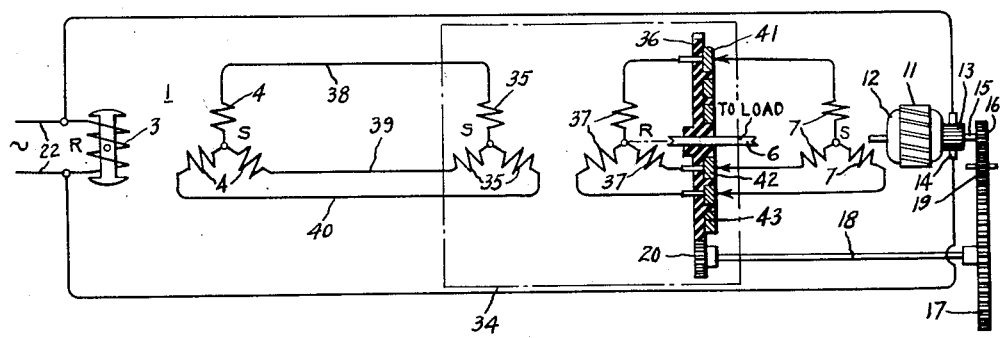
Fig. 3 is a still further modification of the arrangement shown in Fig. 1 involving the use of a differential Selsyn.

The winding 3 of the transmitter Selsyn and the winding 12 of the receiver Selsyn are connected to be energized from any suitable source of periodically varying or alternating current indicated at 22. In the arrangement shown in Fig. 1 the winding 3 and the brushes 14 are shown as connected in series circuit relation. They may, however, be connected in parallel relation as shown in Fig. 3. The polyphase windings 4 of the transmitter Selsyn 1 are electrically connected by conductors 23, 24, and 25 to the corresponding polyphase windings 7 of the receiver Selsyn 2 through the slip rings 8, 9, and 10 so as to permit free rotation of the stator 5 of the receiver Selsyn.

The operation of the system shown in Fig. 1 is as follows:

When the system is energized from the supply source 22, current flows in the transmitter Selsyn winding 3 producing an alternating magnetic flux linking the stator windings 4 inducing currents therein. These currents also flow through the corresponding receiver Selsyn stator windings 7 which produce a magnetic field, the axis of which varies in direction in accordance with the angular position of the transmitter Selsyn rotor and also in accordance with the angular position of the rotatable stator member 5 of the receiver Selsyn relative to a fixed support. Energization of the brushes 14 from the supply source 22 causes current to flow in the receiver rotor winding 12 which produces a magnetic field the axis of which is dependent as to direction upon the position of brushes 14 as explained above. As long as the axes of the rotor and stator magnetic fields of the receiver Selsyn are in correspondence, the rotor 11 remains stationary and the load shaft 6 occupies an angular position bearing a predetermined relation to the angular position of the transmitter Selsyn rotor.

If now the rotor of the transmitter Selsyn is displaced by an angle, say 5 degrees, the axis of the stator field of the receiver Selsyn is also immediately displaced 5 degrees relative to the axis of the field produced by the receiver rotor winding 12. This causes rotation of the receiver rotor 11 which in turn drives the receiver stator 5 through the gear reduction. This action continues until the stator member 5 has rotated 5 degrees at which point the receiver stator magnetic field again becomes aligned with the receiver rotor magnetic field and the rotation of the receiver rotor 11 stops. Therefore it will be apparent that the receiver Selsyn stator member 5 and the load shaft 6 are always maintained in angular correspondence with the rotor of the transmitter Selsyn 1. Because of the arrangement utilizing the commutated receiver rotor winding and a gear reduction interconnecting the receiver rotor and the stator of the receiver Selsyn, it is possible to obtain any desired torque output from the load shaft 6 by suitably selecting the gear ratio, or speed ratio if other driving means is used, between the rotor shaft 15 and the load shaft 6 without any appreciable reduction in the accuracy of the angular correspondence between the transmitter and receiver units. This is obviously a great advantage as higher torque loads can be operated by the receiver Selsyn without increasing the electrical capacity thereof. The increase in torque output obtained by the gear reduction is of course accompanied by a reduction in the speed at which the load shaft 6 follows the rotor of the transmitter Selsyn. However, for most commercial remote control applications, this reduction in speed of the output shaft is of no consequence.

The Selsyn system constructed in accordance with my invention also has an automatic repeatback feature which will now be described. By way of example, let it be assumed that the receiver Selsyn 2 is located several miles from the transmitter Selsyn 1 and the load shaft 6 is connected to operate a valve mechanism. With such an arrangement there will of course be a predetermined relationship between the position of the valve and the angular position of the load shaft 6. When the load shaft 6 and the rotor of the transmitter Selsyn are in angular correspondence, there is a torque which tends to restore and maintain the rotor of the transmitter Selsyn in its equilibrium position. When it is desired to open or close the valve, as the case may be, the rotor of the transmitter Selsyn is rotated an amount corresponding to the desired movement of the remote valve against the force of this restoring torque and is maintained in this new position either manually or by some suitable clamping or fastening arrangement. As the receiver rotor 11 rotates and slowly drives the receiver stator 5 into angular correspondence with the new position of the transmitter rotor, the transmitter restoring torque gradually is reduced and disappears entirely when the correspondence position of the receiver is reached. Thus, after waiting a period of time normally required for the controlling action to take place, the operator may release the rotor of the transmitter Selsyn and if the desired controlling action has taken place, the transmitter Selsyn rotor will remain in the new position of its own accord, thereby giving an indication that the desired controlling action has taken place. If, however, for some reason the receiver Selsyn has jammed or otherwise failed to operate properly to position the load shaft 6 and the controlled valve, the operator will be informed of this fact when he releases the rotor of the transmitter Selsyn and finds that it returns to the initial position or to some intermediate position. Thus it will be seen that my system provides an automatic repeat-back indication without any need for separate auxiliary telemetering equipment.

Figure 2:
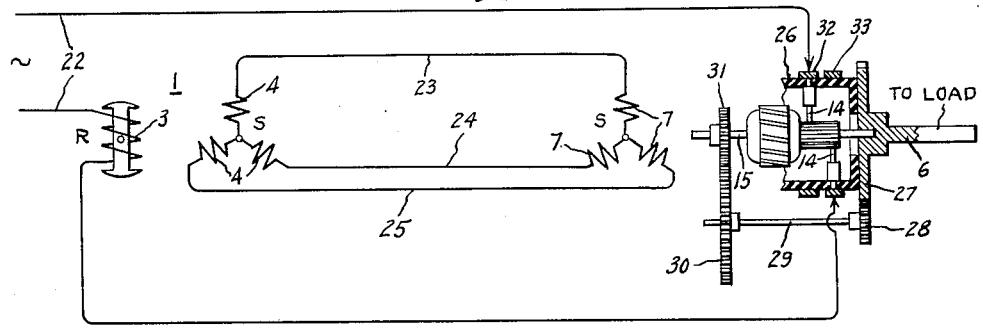
Fig. 2 is a modification of the arrangement shown in Fig. 1 involving the use of a rotating brush arrangement.

In addition to the arrangement shown in Fig. 1 there are several alternative methods by which the receiver Selsyn rotor may be utilized to restore angular correspondence of the receiver rotor and stator magnetic fields after one of the fields has been displaced by action of the transmitter Selsyn. Thus, this restoring action may be accomplished as shown in Fig. 2 of the drawing by rotating the brushes 14 instead of the stator of the receiver Selsyn as in Fig. 1. Referring to Fig. 2 the arrangement is the same as shown in Fig. 1 except that the receiver stator and stator winding 7 are fixed and the brushes 14 are mounted on a rotatable insulating support 26. The rotatable brush support 26 is secured to the load shaft 6 and may be, as shown, mounted on a gear 27 forming a part of the shaft 6. The gear 27 meshes with a pinion 28 carried on a shaft 29, the shaft also carrying a gear 30 which meshes with a pinion 31 carried by the rotor shaft 15. One end of the rotor shaft 15 is mounted for free rotation in a socket forming a part of the hub of the gear 27 and the other end of the shaft 15 may be rotatably mounted in a fixed bearing support, not shown. Slip rings 32 and 33 carried by the rotatable brush support 26 are provided for conducting current from the supply source 22 to the brushes 14 without restricting rotation of the load shaft 6. The operation of the arrangement shown in Fig. 2 is identical to that shown in Fig. 1 except that the receiver rotor 11 slowly drives the brushes 14 around the commutator, thereby rotating the rotor magnetic field into correspondence with the stator magnetic field after it has been displaced by action of the transmitter Selsyn as compared to the arrangement of Fig. 1 in which the stator magnetic field is rotated into correspondence with the rotor magnetic field. These two arrangements are equivalent and produce the same results.

The arrangements shown in Figs. 1 and 2 of the drawing for rotating the receiver Selsyn rotor and stator magnetic fields by rotating the stator or the rotor brushes are mechanical in nature. The receiver Selsyn field rotation may also be accomplished electrically and such an arrangement has been illustrated in the modification shown in Fig. 3 of the drawing to which reference will now be made. The arrangement here illustrated is the same as that shown in Fig. 2 except that the brushes 14 are fixed rather than being rotatably mounted. For the purpose of providing an electrical rotation of the receiver Selsyn stator magnetic field, there is provided a differential Selsyn indicated generally at 34. The differential Selsyn 34, which may be of conventional and well known construction, comprises a stationary stator member (not shown) having wound thereon polyphase windings 35 having polyphase connections and a rotatable rotor member 36 having mounted thereon polyphase windings 37 also having polyphase connections. The rotor member 36 is secured to and carried by the load shaft 6. The polyphase connections of the differential Selsyn stator windings 35 are electrically connected to the polyphase connections of the transmitter Selsyn stator windings 4 by the conductors 38, 39, and 40. The polyphase connections of the windings 37 of the differential Selsyn rotor are electrically connected to the polyphase connections of the receiver Selsyn stator windings by electrical conductors including slip rings 41, 42, and 43 which permit unrestricted rotation of the differential Selsyn rotor. With this arrangement the axis of the field produced by the receiver Selsyn stator winding may be rotated electrically simply by rotating the rotor member 36 of the defferential Selsyn 34. The differential Selsyn rotor member 36 is then coupled to the receiver Selsyn rotor 11 through gearing and it is believed that the operation will be clear in view of the previous description.

In Fig. 4 of the drawing there is shown a modified brush arrangement which may be utilized in connection with the apparatus shown in Figs. 1, 2, and 3. Referring to Fig. 4 it will be noted that the commutator 13 is provided with an additional pair of short-circuited brushes 44 which are located on diametrically opposite sides of the commutator and which are displaced around the periphery of the commutator from the brushes 14 so as to lie in quadrature relation therewith. The additional short-circuited brushes perform two desirable functions, namely, they increase the torque of the rotor Selsyn and also exert a strong damping action tending to prevent overshooting or hunting about the synchronous position. The way in which additional torque is provided may be explained as follows. If there were no power applied to the receiver Selsyn power brushes 14, the receiver would still run when the stator field was not exactly at right angles to the shorted rotor winding which results from the shorted brushes. Under this condition the receiver Selsyn is identical with the usual repulsion motor. When the power is applied to the receiver Selsyn brushes, additional torque is produced and the net torque is greater than it would be without the short-circuited brushes.

The damping action of the short-circuited brushes may be explained in the following manner. With power applied to the receiver Selsyn brushes 14 and the quadrature axis brushes not shorted, as the receiver Selsyn approaches the synchronous position its rotor has a large amount of rotational kinetic energy. This energy normally causes the receiver Selsyn to overshoot a considerable amount and the receiver oscillates until this energy is dissipated due to friction. If, however, the quadrature axis brushes are shorted, a heavy generated current flows through this short circuit whenever the receiver Selsyn has a substantial velocity at the synchronous position. There is a large power loss due to the short circuit current and this power comes from the kinetic energy of the rotor since that is the only torque available to drive the rotor at the synchronous position. The result is that the rotor rapidly loses its extra synchronizing energy and oscillations damp out very rapidly.

A variant of the brush arrangement as shown in Fig. 4 is shown in Fig. 5. In this arrangement adjacent brushes are short-circuited rather than opposite brushes and one power lead is connected to each pair of shorted brushes. Thus, brushes 14a and 44a are shorted together and connected to one power lead and the brushes 14b and 44b are shorted together and connected to the other power lead. It is not necessary that the additional pair of brushes 44 be disposed in exact quadrature relationship with the brushes 14 as other spacing arrangements may be utilized as indicated in Fig. 5, where the brushes 14a, 44a, and 44b, 14b are disposed at less than 90 degrees from each other.

The arrangement of Fig. 5 has the advantage over the arrangement shown in Fig. 4 in that there is less heating of the brushes due to circulating current flowing between adjacent commutator bars bridged by the brushes.

In Fig. 6 of the drawing there is shown a variant of the arrangement shown in Fig. 1 embodying the same fundamental principle of the present invention. In this case the receiver stator 5 is provided with a pair of diametrically opposite salient pole pieces 5a carrying stator windings 7a provided with single phase connections which are connected to the power supply 22. In this case the rotor winding 12 may be the same as that utilized in Fig. 1 but the commutator is provided with symmetrically spaced polyphase brushes 14c, 14d, and 14e, which are electrically connected to the polyphase connections of the transmitter Selsyn stator winding 4 by the conductors 23, 24, and 25. This modification operates the same way as that disclosed in Fig. 1, the only difference being that the transmitter Selysyn 1 operates to shift the axis of the rotor magnetic field as distinguished from the arrangement of Fig. 1 in which the transmitter Selsyn acts to shift the stator magnetic field. It will be understood that in this case the load is mechanically coupled to the stator 5. This arrangement has the advantage that the receiver Selsyn stator member and winding thereon can be the same as the field construction used in a conventional salient-pole direct current machine. This construction is somewhat cheaper and has the advantage that more torque is obtained due to the salient-pole construction.

It will be apparent from the foregoing that I have provided improved Selsyn motion transmitting apparatus which gives much higher output torque than has been possible heretofore with apparatus of comparable cost and complexity.

Although I have shown and described particular embodiments of my invention, I do not desire to be limited to the particular embodiments described, and I intend in the appended claims to cover all modifications which do not depart from the spirit and scope of my invention.

What I claim as new and desire to secure by Letters Patent of the United States, is:

1. A motion transmitting system of the self-synchronous type comprising a transmitter unit having a winding provided with a single phase connection adapted to be energized from a source of periodically varying current and a relatively rotatable winding having polyphase connections, a receiver unit having a stator member and a rotor member having windings associated therewith, one of said receiver windings having polyphase connections connected to the transmitter winding having polyphase connections and the other receiver winding having a single phase connection adapted to be energized from said source of periodically varying current, the winding associated with the receiver rotor being a commutated winding to which current is conducted through brushes, synchronizing means comprising a mechanically rotatable member for effecting relative rotation of the axes of the magnetic fields produced by the receiver stator and rotor windings, and means for connecting said rotatable member to be driven by the receiver rotor at a speed such that the relative rotation of said axes occurs at a speed different from the angular speed of said receiver rotor.

2. A receiver unit for a motion transmitting system adapted to be connected to an electrical motion transmitter of the type having a winding provided with a single phase connection connected to a source of periodically varying current and a relatively rotatable winding having polyphase connections, said receiver unit comprising a stator member and a rotor member having windings associated therewith, one of said receiver windings having polyphase connections adapted to be connected to the transmitter winding having polyphase connections and the other receiver winding having a single phase connection adapted to be connected to said source of periodically varying current, the winding associated with the receiver rotor being a commutated winding to which current is conducted through brushes, means comprising a rotatable member for effecting relative rotation of the axes of the magnetic fields produced by the receiver stator and rotor windings, and means for connecting said rotatable member to be driven by the receiver rotor at a speed such that the relative rotation of said magnetic field axes occurs at a speed different from the angular speed of said receiver rotor.

3. A receiver Selsyn adapted to be connected to a transmitter Selsyn of the type having a winding with single phase connections energized from a source of periodically varying current and a relatively rotatable winding having polyphase connections, said receiver Selsyn comprising a stator member having a winding thereon with single phase connections adapted to be connected to said source of periodically varying current, a rotor member having a commutated winding to which current is conducted through polyphase brushes, means for electrically connecting said brushes to the winding of said transmitter Selsyn having polyphase connections, means comprising a rotatable member for effecting relative rotation of the axes of the magnetic fields produced by the receiver Selsyn stator and rotor windings, and means for connecting said rotatable member to be driven by the receiver Selsyn rotor at a speed such that the relative rotation of said axes occurs at a speed different from the angular speed of said receiver rotor.

4. A Selsyn angular motion transmitting system comprising a transmitter Selsyn having rotor and stator members with windings thereon one of which has single phase connections and the other having polyphase connections, a receiver Selsyn having rotor and stator members both of which are rotatable about a common axis relative to a fixed support, said receiver Selsyn stator having a winding thereon with polyphase connections electrically connected to the winding of said transmitter Selsyn having polyphase connections, said receiver Selsyn rotor member having a winding thereon connected to a commutator engaged by brushes fixed relative to said support, means for connecting the windings of said transmitter Selsyn having single phase connections and said brushes to a source of periodically varying current, and means for drivably connecting said receiver Selsyn rotor member to said receiver Selsyn stator member through a speed reduction device whereby said receiver Selsyn stator member is slowly driven into angular correspondence with the rotor member of said transmitter Selsyn with a high torque output.

5. A Selsyn angular motion transmitting system comprising a transmitter Selsyn having rotor and stator members with windings thereon one of which has single phase connections and the other having polyphase connections, a receiver Selsyn having rotor and stator members, said receiver Selsyn stator member having a winding thereon with polyphase connections electrically connected to the winding of said transmitter Selsyn having polyphase connections, said receiver Selsyn rotor member having a winding thereon connected to a commutator engaged by brushes, means for rotating said brushes relative to the receiver Selsyn stator member, means for connecting the winding of said transmitter Selsyn having single phase connections and said brushes to a source of periodically varying current, and means for drivably connecting said receiver Selsyn rotor member to said brush rotating means through a speed reduction device whereby said receiver Selsyn brushes are slowly driven to angular correspondence with the rotor member of said transmitter Selsyn with a high torque output.

6. A Selsyn angular motion transmitting system comprising a transmitter Selsyn having rotor and stator members with windings thereon one of which has single phase connections adapted to be connected to a source of periodically varying current and the other having polyphase connections, a receiver Selsyn having rotor and stator members both of which are rotatable about a common axis relative to a fixed support, said receiver Selsyn stator member having a single phase winding adapted to be connected to said source of periodically varying current, said receiver Selsyn rotor member having a winding thereon connected to a commutator, a plurality of brushes engaging said commutator for providing polyphase connections to said receiver Selsyn rotor winding, means for electrically connecting said brushes to the transmitter Selsyn winding having polyphase connections, and means for drivably connecting said receiver Selsyn rotor member to said receiver Selsyn stator member through a speed reduction device whereby said receiver Selsyn stator member is driven into angular correspondence with the transmitter Selsyn rotor member with a high torque output.

7. A motion transmitting system of the self-synchronous type comprising a transmitter unit having a winding provided with single phase connections adapted to be energized from a source of periodically varying current and a relatively rotatable winding having polyphase connections, a receiver unit having a stator member and a rotor member having windings associated therewith, one of said receiver windings having polyphase connections connected to the transmitter winding having polyphase connections and the other receiver winding having a single phase connection adapted to be energized from said source of periodically varying current, the winding associated with the receiver rotor being a commutated winding to which current is conducted through brushes, means comprising a rotatable member for effecting relative rotation of the axes of the magnetic fields produced by the receiver stator and rotor windings, and means for connecting said rotatable member to be driven by the receiver rotor at a speed such that the relative rotation of the axes occurs at a speed less than the angular speed of said receiver rotor.

8. A receiver unit for a motion transmitting system adapted to be connected to an electrical motion transmitter of the type having a winding provided with a single phase connection connected to a source of periodically varying current and a relatively rotatable winding having polyphase connections, said receiver unit comprising a stator member and a rotor member having windings associated therewith, one of said receiver windings having polyphase connections adapted to be connected to the transmitter winding having polyphase connections and the other receiver winding having single phase connections adapted to be connected to said source of periodically varying current, the winding associated with the receiver rotor being a commutated winding to which current is conducted through brushes, means comprising a rotatable member for effecting relative rotation of the axes of the magnetic fields produced by the receiver stator and rotor windings, and means for connecting said rotatable member to be driven by the receiver rotor at a speed such that the relative rotation of said axes occurs at a speed less than the angular speed of said receiver rotor.

9. A receiver Selsyn adapted to be connected to a transmitter Selsyn of the type having a winding with single phase connections energized from a source of periodically varying current and a relatively rotatable winding having polyphase connections, said receiver Selsyn comprising a station member having a winding thereon with single phase connections adapted to be connected to said source of periodically varying current, a rotor member having a commutator winding to which current is conducted through polyphase brushes, means for electrically connecting said brushes to the winding of said transmitter Selsyn having polyphase connections, synchronizing means comprising a mechanically rotatable member for effecting relative rotation of the axes of the magnetic fields produced by the receiver Selsyn stator and rotor windings, and means for connecting said rotatable member to be driven by the receiver Selsyn rotor at a speed less than the angular speed of said receiver rotor.

ARTHUR P. ADAMSON.

REFERENCES CITED

The following references are of record in the file of this patent:

UNITED STATES PATENTS

| Number | Name | Date |
|---|---|---|
| 866,820 | Smith | Sept. 24, 1907 |
| 1,068,759 | Girardelli | July 29, 1913 |
| 1,393,038 | Rankin | Oct. 11, 1921 |
| 1,708,541 | House | Apr. 9, 1929 |
| 1,874,094 | Ford et al. | Aug. 30, 1932 |